Patented July 1, 1941

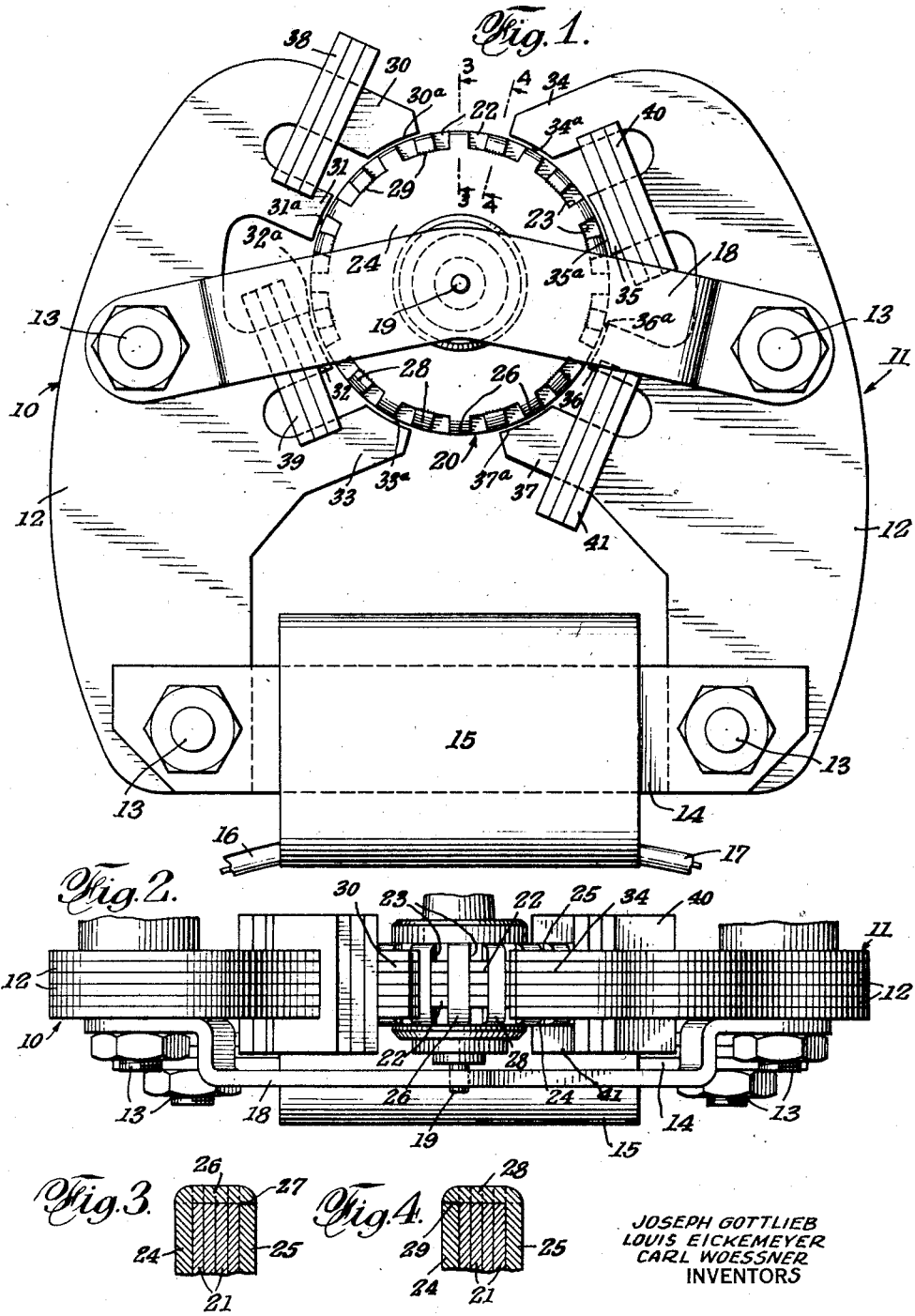

2,247,489

UNITED STATES PATENT OFFICE 2,247,489

SELF-STARTING SYNCHRONOUS MOTOR

Joseph Gottlieb, Deal, and Louis Eickemeyer and Carl Woessner, Jersey City, N. J.; said Eickemeyer and said Woessner assignors to said Gottlieb Application April 16, 1940, Serial No. 329,850

1 Claim. (Cl. 172—278)

The present invention relates to a synchronous motor and more particularly to a device of the general character indicated which is of the self-starting type such as may readily be utilized for the driving of an electric clock.

It is the main object of the present invention to provide a self-starting synchronous motor which is simple in construction, easy and economical to fabricate and assemble, and which is admirably adapted to perform its intended functions as hereinafter more specifically pointed out.

In the accompanying specification, there will be described, and in the annexed drawing shown, an illustrative embodiment of the present invention. It is, however, to be clearly understood that the present invention is not limited to said illustrative embodiment, the latter being set forth for purposes of illustration only. As will be seen as the detailed description progresses, changes may be made in the aforesaid illustrative embodiment of the present invention without the exercise of invention and within the scope of the claims hereto appended.

In the accompanying drawing, Fig. 1 is a side elevational view of the aforesaid illustrative embodiment of the present invention;

Fig. 2 is a top elevational view of the same;

Fig. 3 is a fragmentary, vertical sectional view taken on line 3—3 of Fig. 1; and Fig. 4 is a similar view taken on line 4—4 of Fig. 1.

Before describing the present invention in detail, it is deemed advisable briefly to refer to the prior art in the field to which the present invention relates, to point out one of the disadvantages thereof, and to indicate the manner in which the present invention overcomes the same.

Self-starting synchronous motors have long been used for driving electric clocks. The rotors of such motors combine some of the characteristics of a conventional synchronous motor rotor and some of the characteristics of a conventional induction motor rotor. It has been found that such a combined rotor is rather intricate in construction and therefore costly to make with the result that self-starting electric clocks have not been available at a relatively low price. By means of the present invention, there is provided a very simply constructed rotor which lends itself to conventional manufacturing methods, thus enabling the production of a low cost self-starting synchronous motor.

Other objects and advantages of the device of the present invention will readily occur to those skilled in the art.

Referring now more in detail to the aforesaid illustrative embodiment and with particular reference to the drawing illustrating the same, the numerals 10 and 11 generally designate pole pieces, each made of a plurality of laminations 12 of magnetic material, the laminations being held together by a plurality of bolts 13.

The upper ends of the poles 10 and 11 are spaced apart as shown in Fig. 1 of the drawing so as to create a field between them and the lower ends of said poles are connected by a laminated yoke 14, adapted to support an energizing coil 15 which may be connected to a source of alternating current by the wires 16 and 17.

The poles 10 and 11 are affixed in any desired manner to a support plate (not shown), which may constitute part of a frame which supports the gear trains of a clock adapted to be driven by the synchronous motor of the present invention, the clock, of course, constituting no part of the present invention.

In order to maintain the poles 10 and 11 in properly spaced relation, there is affixed thereto, a bridge 18 made of nonmagnetic material, the bridge having journalled therein, at the center thereof, a shaft 19 adapted to support a rotor 20 positioned intermediate the poles 10 and 11 within the field thereof.

The rotor 20 is of the type known as a squirrel cage and consists of a plurality of laminations 21 made of magnetic material, which laminations are provided, at the periphery thereof, with a multiplicity of radially disposed teeth 22, spaced from each other as at 23. The teeth 22 are, of course, of uniform width and the spaces 23 intermediate the same are of the same width. The squirrel cage rotor is short circuited and in order to attain this condition, the outer surfaces of the outer laminations 21 are covered with copper facing plates 24 and 25, the plate 24 being provided at the periphery thereof, with a multiplicity of radially disposed teeth 26. These teeth are spaced from each other by a distance equivalent to triple their own width, and are bent at right angles to the plate 24 so as to be disposed within alternate spaces 23 of the laminations 21. The teeth 26 are affixed in this position by being soldered, as at 27, to the periphery of the other copper facing plate 25, as best seen in Fig. 3 of the drawing. The plate 25 is likewise provided with a multiplicity of the radially disposed teeth 28 which are similarly spaced and which are bent over at right angles to the plate 25 and are disposed within the remaining spaces 23 of the laminations 21 to be affixed to the periphery of the plate 24 by soldering 29, as best seen in Fig. 4 of the drawing.

There is thus provided a squirrel cage rotor consisting of a plurality of laminations of magnetic material, faced with copper plates, the periphery of the rotor being provided with alternate steel and copper teeth, as can best be seen in Fig. 2 of the drawing.

Returning again to the description of the pole pieces 10 and 11, the former is provided with a plurality, here shown as 4, pole sections 30, 31, 32, and 33, and the latter is provided with a plurality of pole sections 34, 35, 36, and 37. The sections of the pole 10 are provided with arcuate terminal faces 30a, 31a, 32a, and 33a, and the sections of the pole 11 are provided with arcuate terminal faces 34a, 35a, 36a, and 37a.

In order to cause the rotor 20 to rotate immediately upon energizing the field, it is necessary to create a revolving flux and this is accomplished by forcing over alternate pole sections of the poles 10 and 11 laminated copper shading coils 38, 39, 40, and 41. The coils 38 and 39 are disposed about the sections 30 and 32 of the pole 10 and the coils 40 and 41 are disposed about the sections 35 and 37 of the pole 11. The shading coils are designed so that in addition to shading alternate pole sections, they contact and support the adjacent pole sections so as to maintain the spacing between the various pole sections in a predetermined relation; for, if this spacing should change the motor will stop.

It has been found that making alternate copper and steel teeth of the rotor 20 of the uniform width lends itself admirably to conventional manufacturing methods and therefore enables the production of low cost self-starting synchronous motor. However, the fact that the teeth are of uniform width gives rise to an additional problem which it is necessary to solve. It has been found that upon energizing the field, the unshaded poles grip the rotor and lock the same against rotation. This is due to the disparity between the strength of the flux flowing through the shaded and unshaded pole sections. In order to overcome this, the arcuate terminal faces of the unshaded poles are made of lesser length than the arcuate terminal faces of the shaded poles. For example, and as can readily be seen from Fig. 1 of the drawing, the faces 31a, 33a, 34a, and 36a, extend a length equivalent to approximately two and one-half alternate steel and copper teeth of the rotor 20, while the arcuate terminal faces 30a, 32a, 35a, and 37a, extend a length equal to approximately the width of three alternate teeth of the rotor 20. In other words, the length of the terminal faces of the shaded pole sections corresponds to an integral number of rotor teeth, while the terminal faces of the unshaded pole sections extend a length equivalent to a lesser, non-integral number of rotor teeth. Of course, when the shaded pole sections are in register with the teeth of the rotor, the unshaded pole sections are out of register with the teeth; and vice versa.

It is preferred that the synchronous motor of the present invention be operated by 60 cycle A. C. and it is also preferred that the rotor rotate 300 R. P. M. It is therefore necessary that the rotor be provided with 24 of the teeth 22. Obviously, if the current is of a different number of cycles or it is desired that the rotor have a speed different from 300 R. P. M., then the number of teeth on the rotor must accordingly be changed.

This completes the description of the aforesaid illustrative embodiment of the present invention and the mode of operation thereof may be briefly summarized as follows:

When the coil 15 is energized by a source of alternate current, the poles 10 and 11 are energized. However, in view of alternate sections of the poles 10 and 11 being provided with shading coils, the flux in the shaded pole sections is retarded, with the result that, between the two poles 10 and 11, a revolving field is set up. Inasmuch as the rotor 20 is originally in a static condition, the revolving field of the poles 10 and 11 causes the copper teeth 26 and 28 to cut the line of force, thus inducing an E. M. F. in the rotor 20. The induction of this E. M. F. causes the rotor to rotate in an endeavor to catch up with the rotating magnetic field. When the speed of the rotor reaches the speed of the revolving field, there ceases to be induced in the rotor an E. M. F.; but at this time, the rotor falls into step with the alternating current and so the motor, from that point on, functions as a conventional synchronous motor.

This completes the description of the mode of operation of the aforesaid illustrative embodiment of the present invention and as can be seen from all of the foregoing, the present invention is simple in construction, easy and economical to fabricate and assemble and admirably adapted to perform its intended functions.

What we claim as our invention is:

In a self-starting synchronous motor, a squirrel cage rotor having alternate magnetic and conducting teeth of uniform width, a pair of oppositely disposed pole pieces each having a plurality of pole sections, and means associated with some of said pole sections to shade the flux therein whereby a revolving field is created, the terminal faces of the shaded pole sections having a length equivalent to the width of an integral number of said rotor teeth and the terminal faces of the remaining pole sections having a length equivalent to the width of a non-integral, lesser number of said rotor teeth.

JOSEPH GOTTLIEB.
LOUIS EICKEMEYER.
CARL WOESSNER.